United States Patent
Harding et al.

(10) Patent No.: US 8,482,594 B2
(45) Date of Patent: Jul. 9, 2013

(54) MULTI-RESOLUTION OPTICAL SYSTEM AND METHOD OF FABRICATING SAME

(75) Inventors: Kevin George Harding, Niskayuna, NY (US); Gil Abramovich, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 462 days.

(21) Appl. No.: 12/818,545

(22) Filed: Jun. 18, 2010

(65) Prior Publication Data

US 2011/0310218 A1    Dec. 22, 2011

(51) Int. Cl.
H04N 7/00 (2011.01)
H04N 13/00 (2006.01)
H04N 13/02 (2006.01)
H04N 13/04 (2006.01)

(52) U.S. Cl.
USPC .............. 348/36; 348/45; 348/49; 348/54; 348/56

(58) Field of Classification Search
USPC ....................................................... 348/36
See application file for complete search history.

(56) References Cited

U.S. PATENT DOCUMENTS

| | | | |
|---|---|---|---|
| 5,172,235 A | 12/1992 | Wilm et al. | |
| 5,438,187 A * | 8/1995 | Reddersen et al. | 235/462.22 |
| 5,757,423 A | 5/1998 | Tanaka | |
| 5,926,218 A | 7/1999 | Smith | |
| 6,097,897 A * | 8/2000 | Ide | 396/93 |
| 6,160,668 A | 12/2000 | Rogers | |
| 6,172,805 B1 | 1/2001 | Grech | |
| 6,853,809 B2 | 2/2005 | Pelletier | |
| 2006/0165288 A1* | 7/2006 | Lee et al. | 382/181 |
| 2006/0175549 A1 | 8/2006 | Miller et al. | |
| 2010/0220185 A1* | 9/2010 | Vertoprakhov et al. | 348/92 |
| 2011/0080311 A1* | 4/2011 | Pushkarsky et al. | 342/14 |

FOREIGN PATENT DOCUMENTS

| | | |
|---|---|---|
| DE | 4226892 A1 | 2/1994 |
| WO | 98/05990 A1 | 2/1998 |

OTHER PUBLICATIONS

EP Search Report issued in connection with corresponding EP Patent Application No. 11169119.2 filed on Jun. 8, 2011.
Harding, "Analysis of methods for image rearrangement," Proceedings of SPIE, Optics, Illumination, and Image Sensing for Machine Vision VIII, vol. 2065, pp. 10-16, 1994.
Xuejing, "Video Surveillance System Based on Double Cameras," Proceedings of SPIE, Multimedia Systems and Applications VII, vol. 5600, pp. 265-268, 2004.

* cited by examiner

*Primary Examiner* — David Czekaj
*Assistant Examiner* — Nam Pham
(74) *Attorney, Agent, or Firm* — Ziolkowski Patent Solutions Group, SC; Jean K. Testa

(57) ABSTRACT

A multi-resolution lens system includes a relay lens configured to be directed toward a field-of-view (FOV) and receive a first plurality of image photons emanating from the FOV, a high-resolution lens positioned to receive a second plurality of image photons from the FOV and to pass the second plurality of image photons toward the relay lens, and a shutter device positioned to receive over an area thereof the image photons of the FOV that pass through the relay lens, and simultaneously receive overlaid on a portion of the area thereof the image photons from the portion of the FOV that pass through the high-resolution lens and toward the relay lens.

22 Claims, 2 Drawing Sheets

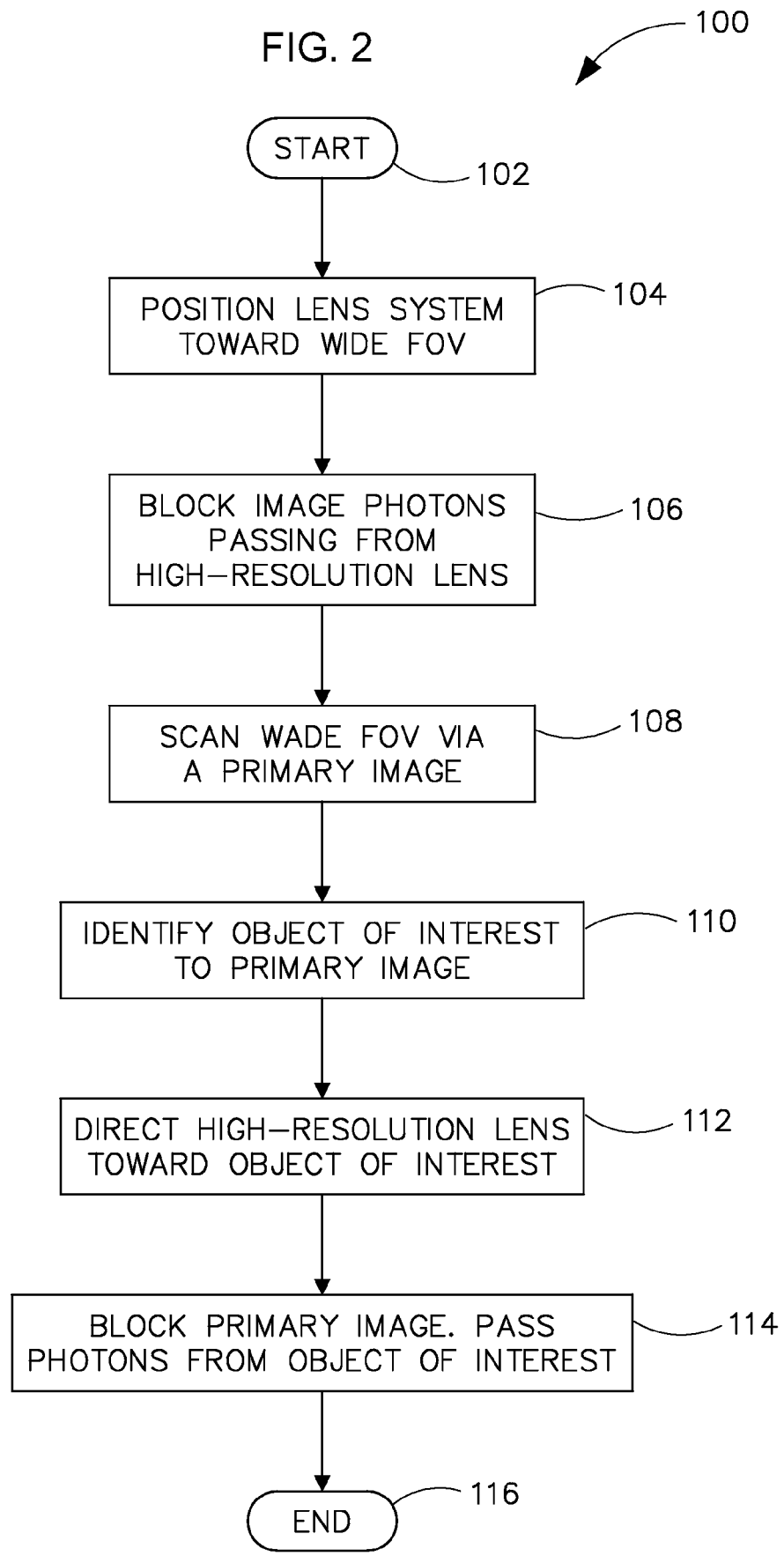

MULTI-RESOLUTION OPTICAL SYSTEM AND METHOD OF FABRICATING SAME

BACKGROUND OF THE INVENTION

Embodiments of the invention relate generally to a fast addressable multi-resolution lens system, and more particularly to a camera system that includes low and high resolution modes.

Optical recognition camera systems may be used to recognize objects in an image in industrial and security settings, as examples. In an industrial setting, these systems may be used in industrial inspection, serving the role to not only do basic inspections (component present/absent) but also to direct a mechanism to reject parts, position robots, or update databases, as examples.

In a security application, as another example, cameras may be used to identify individual faces in a crowd. In such an application, a system may use a first camera viewing a wide scene that may include a crowd of multiple people as well as other objects in a scene and a second camera having a higher resolution as well as a face recognition application that may be used to identify an individual within the crowd. Methods of two-dimensional (2D) face recognition have been widely published and are in use commercially today. These methods include such tools as large scale correlation, key point selection, wavelets and segmenting of the face into key components. In one example, a "self portrait" mode is made specifically to snap a picture when a face is positioned in the center of the camera view.

Today, dual resolution systems, or optical systems are often based upon dual camera systems or mechanical zooms. In these systems, the large view camera examines the scene, and then a high resolution camera is panned and tilted to a specific location. Thus, for high magnification in a traditional system, some means for pan and tilt are needed to move the small field-of-view for focusing on various specified locations. Typical security camera pan tilt units are large units that move the whole camera and are motorized by stepper motors or potentiometer equipped DC motors.

These systems that include movement of the whole camera have the disadvantage, especially in a security application, of potentially indicating to imaged subjects that they are in fact being viewed. For example, movement of a whole camera may draw the attention of the subject being imaged, and any panning and tilting of such a camera to coincide with the movement of the subject may indicate that the subject is of particular interest. Typical systems may also have the disadvantage of the cost of a second camera, and a speed of the pan/tilt mechanism may be too slow to follow subject movement. Further, these systems can have a reduced reliability because of the number of components and because of the mechanical mechanisms used to pan/tilt or autofocus the camera, which can lead to additional maintenance costs and system downtime. Thus, for reasons of reliability, cost, and performance, it is desirable to minimize the number of moving elements in a face recognition system.

One solution for a multiple resolution camera may be to integrate precise actuators into the lens itself. Small simple actuators can provide the limited pan, tilt, and focus without moving the entire system. However, this technology, based on piezo-driven lead screws, is typically only capable of short travel and light loads, thus limited to smaller lenses. Overall, these systems having piezoelectric focus mechanisms also tend to be expensive.

Therefore, it would be desirable to design an optical system and a method of fabricating same that overcomes the aforementioned drawbacks.

BRIEF DESCRIPTION OF THE INVENTION

The invention is a multi-resolution optical system and a method of fabricating same.

According to one aspect, a multi-resolution lens system includes a relay lens configured to be directed toward a field-of-view (FOV) and receive a first plurality of image photons emanating from the FOV, a high-resolution lens positioned to receive a second plurality of image photons from the FOV and to pass the second plurality of image photons toward the relay lens, and a shutter device positioned to receive over an area thereof the image photons of the FOV that pass through the relay lens, and simultaneously receive overlaid on a portion of the area thereof the image photons from the portion of the FOV that pass through the high-resolution lens and toward the relay lens.

According to another aspect, a method of manufacturing a lens assembly includes providing a housing having a first aperture and a second aperture, and positioning a relay lens in the housing to receive image photons that pass from a field-of-view (FOV) and through the first aperture, and pass the image photons toward the second aperture. The method further includes positioning a high-resolution lens in the housing and between the first aperture and the relay lens, and positioning a shutter device between the relay lens and the second aperture.

According to another aspect, a computer readable storage medium having stored thereon a computer program, the computer program configured to generate an image of a full field-of-view (FOV), the image generated from photons passing from the full FOV, through a relay lens, and toward a shutter device, identify a first object-of-interest within the image for magnification, and position a high resolution lens to receive and pass photons from the identified first object-of-interest, through the relay lens, and toward the shutter device.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings:

FIG. 2 is a method of operating the multi-resolution optical system of FIG. 1.

DETAILED DESCRIPTION

Figure 1:
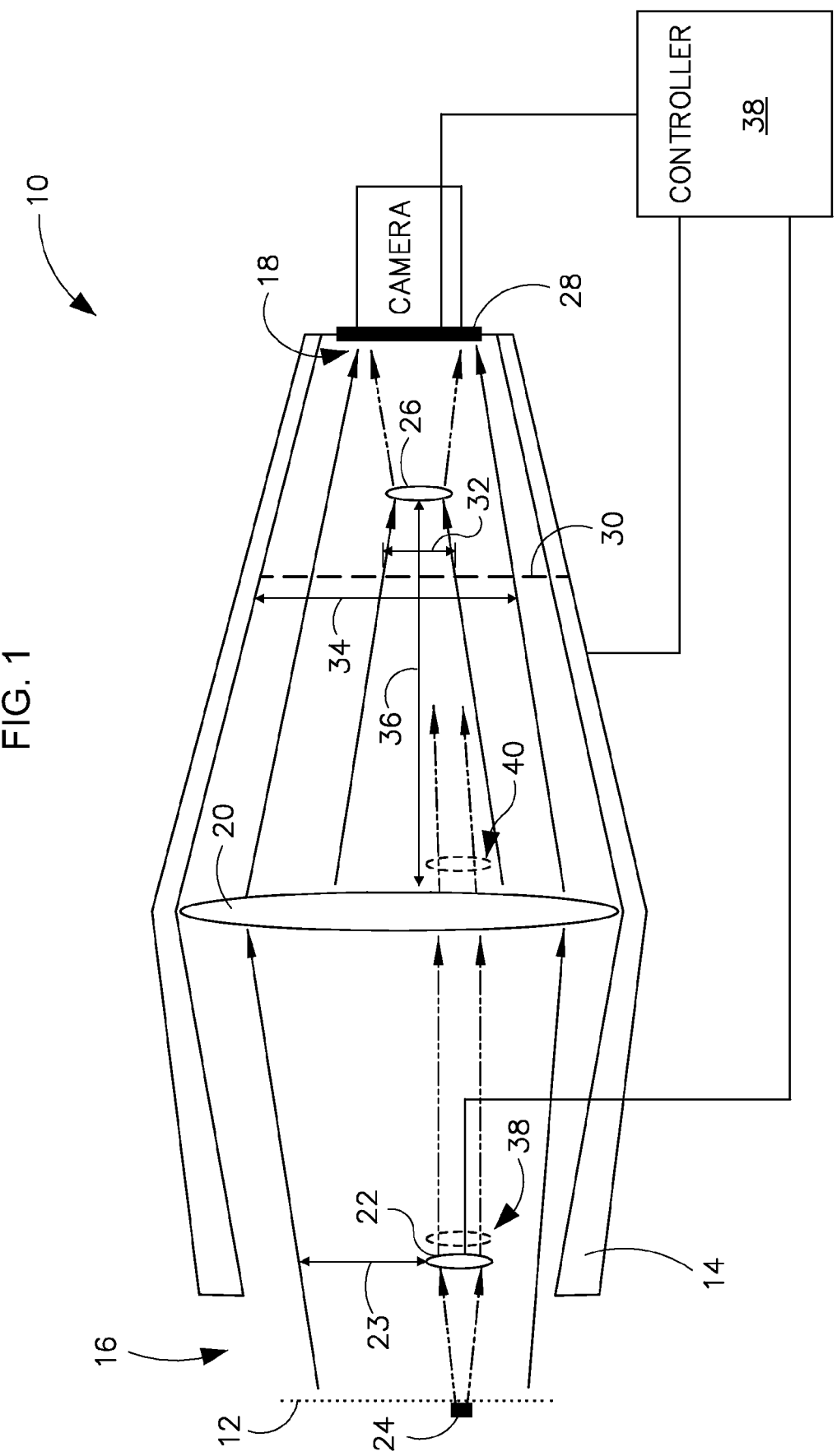
FIG. 1 is a multi-resolution optical system according to an embodiment of the invention.

The operating environment of embodiments of the invention is described below with respect to a security camera or optical system for observing faces in a crowd at a first, low resolution and then automatically zooming in on a face within the crowd using a second, high resolution. The system described herein may be employed having an automatic face recognition capability, or it may be manually operated by security personnel while scanning a crowd and then focusing on a face within the crowd. Further, the system and method described herein are not limited to a security setting related to face recognition, but may be used in general for surveillance, as an example. For instance, a wide field-of-view (FOV) may be scanned or viewed at low resolution, and when an object or scenario of interest is identified for particular surveillance, a close-up or high-resolution FOV of the object of interest may be obtained.

Also, the operating environment is not limited to a security or surveillance environment. For instance, in an industrial inspection application, several parts may be viewed in a low resolution FOV, and then a close-up or high-resolution view may be obtained of one of the parts, according to embodiments of the invention. Thus, the embodiments of the invention described herein are applicable to any imaging system or application that may benefit from an ability to quickly switch between a low resolution FOV and a high resolution image of an object within the FOV using a single dual-resolution camera.

Referring to FIG. 1, a multi-resolution imaging system 10 is shown according to an embodiment of the invention. Imaging system 10 is a lens system that creates a primary image by viewing a wide FOV 12 using a low resolution arrangement of lenses, and then is able to focus on an object within the primary image and magnify an image of the object using a high resolution arrangement of the lenses. Imaging system 10 includes a housing 14 having a first aperture 16 and a second aperture 18. Imaging system 10 includes a relay lens 20 positioned to view wide FOV 12 or to receive photons therefrom for the creation of a primary image based on wide FOV 12. In front of relay lens 20 is a secondary or high-resolution lens 22 that is smaller in aperture than relay lens 20 and not fully blocking relay lens 20. High-resolution lens 22 is positionable along a direction 23 transverse with respect to relay lens 20 and within imaging system 10 to view a smaller region or sub-region 24 within wide FOV 12. In one alternative, high-resolution lens 22 may be a liquid crystal lens that can be addressed electronically. High-resolution lens 22 and relay lens 20 together are made to create a secondary or small field image at infinity (a collimated field) of only a small region captured from within the primary image of wide FOV 12. In one embodiment, high-resolution lens 22 is selected having a focal length that corresponds to a distance from high-resolution lens 22 to smaller region or sub-region 24.

Imaging system 10 includes a focusing lens 26 that is typically in a fixed location and positioned behind relay lens 20 to bring the small field image of smaller region or sub-region 24 back into focus and centered on a sensor or digitizing input 28. In one embodiment, digitizing input 28 is attached to housing 14 at second aperture 18, and in another embodiment, digitizing input 28 is separate from housing 14 and not attached thereto. Imaging system 10 includes a controllable blocking device 30, which may include an LCD or a mechanical shutter, as examples, which may be controlled to selectively block portions thereof from transmitting photons therethrough and to allow photons to pass through unblocked portions. For instance, an image of smaller region or sub-region 24 may pass to high-resolution lens 22, to relay lens 20, and to controllable blocking device 30 over a first area 32. Simultaneously, the primary image from wide FOV 12 passes to relay lens 20 and then to controllable blocking device 30 over a second area 34 thereof. Relay lens 20 is sized and positioned to receive the primary image and pass the image to controllable blocking device 30. In one embodiment, relay lens 20 is selected having a focal length 36 that corresponds to a distance between relay lens 20 and controllable blocking device 30, so that blocking device 30 is positioned properly with respect to relay lens 20.

Imaging system 10 includes a controller 38 coupled to digitizing input 28 and high-resolution lens 22. High-resolution lens 22 and relay lens 20 together create a secondary image at infinity (a collimated field) of sub-region 24 of wide FOV 12, which is directed toward digitizing input 28. Relay lens 20, at the same time, overlaps a large field image of the primary image which includes wide FOV 12, which is also directed toward digitizing input 28. The secondary image is generated from sub-region 24 and may include a face in a crowd or an object for inspection in, for instance, a manufacturing environment, as examples. Thus, imaging system 10 may be directed toward wide FOV 12 by maintaining imaging system 10 in a stationary position where wide FOV 12 is viewable therefrom. In one embodiment, not illustrated, imaging system 10 may be positioned on a rotatable device that is controllable via a controller such as controller 38 or via a remote access device such as a web page on the Internet that is itself remotely accessible and controllable.

Referring now to FIG. 2 and imaging system 10 of FIG. 1, a technique 100 for operating the multi-resolution optical system of FIG. 1 is illustrated. Technique 100 starts at step 102, and at step 104, a lens system, such as that included in housing 14 of FIG. 1, is positioned to face toward a wide FOV. A user may view a wide FOV, such as wide FOV 12 of FIG. 1, by selectively blocking secondary image photons passing from high-resolution lens 22, at step 106, via first area 32 of controllable blocking device 30. As such, although first area 32 of controllable blocking device 30 is blocked, one skilled in the art will recognize that a complete primary image of wide FOV 12 may nevertheless be generated on digitizing input 28. The primary image is scanned at step 108 for an object-of-interest by a user or by object recognition software to determine if a closer look is needed for any object-of-interest in the primary image. Upon recognizing or identifying such an object-of-interest for, such as smaller region or sub-region 24, at step 110, high-resolution lens 22 is transversely positioned within housing 14 to be directed thereto in step 112. At step 114, controllable blocking device 30 may be switched to allow image photons of smaller region or sub-region 24 to pass through first area 32, while at the same time causing the remainder of second area 34 of controllable blocking device 30 to be blocked. The process ends at step 116.

Thus, image photons of wide FOV 12 are passed to second area 34 of controllable blocking device 30 while image photons of smaller region or sub-region 24 passing from high-resolution lens 22 are simultaneously passed to first area 32 of controllable blocking device 30. The passage of image photons from either wide FOV 12 or sub-region 24 to digitizing input 28 may be quickly toggled by simply selecting which area of controllable blocking device 30 to block. Controllable blocking device 30 may be, for example, an LCD or similar blocking device that selectively blocks either the large (wide) field rays or the small (narrow) field rays. In alternatives, the blocking can occur at the location of high-resolution lens 22, at the location of the secondary image behind relay lens 20, or at focusing lens 26 behind controllable blocking device 30, as examples. For instance, a controllable blocking device may be positioned at a first alternate location 38 or a second alternate location 40, which may be controllably blocked in the same manner as described with respect to controllable blocking device 30.

Thus, two images are available simultaneously and may be selectively directed toward digitizing input 28 via controllable blocking device 30, or via the other means of selectively blocking, as mentioned.

Alternative embodiments include digital image segmentation, color filtering, or other known methods to select the image to be projected to digitizing input 28. In one embodiment, only one frame may be used to quickly grab each high resolution image of a subject or object, leaving a wide field image useable as a continuous, human observable image.

Embodiments of the invention may be designed to produce from images photons based on the visible light spectrum or based on another spectrum such as the infrared (IR) spectrum to produce thermal images from a nighttime or dark environment. Thus, depending on the desired spectrum of photons to be imaged (visible light, near IR, etc.), controllable blocking device 30 is correspondingly configured to include an ability to selectively block or allow photons in the desired spectrum.

As such, embodiments of the invention provide fast access switching between a wide field and a close up image. By incorporating two images having different resolution into one lens system, excessive costs of a second camera and pan-tilt system is avoided. Further, by having an ability to transversely locate a high resolution lens within the imaging system, a reliable and robust means is provided to locate a particular region of interest within a FOV and to focus thereon. The system includes few moving parts, thus a high degree of reliability may be realized. Also, such a system is non-intrusive to subjects during surveillance, and subjects may be viewed and focused on without their knowledge. In addition, such a system can be retrofitted into current installations for a relatively low cost, providing an attractive alternative for users who desire improved image quality over existing systems.

Thus, embodiments of the invention remove the need to use a dual separate camera system or to use pan and tilt cameras by transferring means of selecting a specific region within a field to a local image within the optical system. Mapping locations within a wide FOV or large field image may be directly addressed with a simple transversely positionable high-resolution lens, rather than with more complex operation of a separate pan and tilt camera. Embodiments of the invention also permit a fast change from one image to another by being able to address a location very quickly (i.e., no moving a whole camera, but rather moving an internal lens a small distance) and by being able to use electronic means such as an LCD or mechanical shutter to select one image or the other.

A technical contribution for the disclosed method and apparatus is that is provides for a computer implemented camera system that includes a low resolution mode and a high resolution mode.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

According to one embodiment, a multi-resolution lens system includes a relay lens configured to be directed toward a field-of-view (FOV) and receive a first plurality of image photons emanating from the FOV, a high-resolution lens positioned to receive a second plurality of image photons from the FOV and to pass the second plurality of image photons toward the relay lens, and a shutter device positioned to receive over an area thereof the image photons of the FOV that pass through the relay lens, and simultaneously receive overlaid on a portion of the area thereof the image photons from the portion of the FOV that pass through the high-resolution lens and toward the relay lens.

According to another embodiment, a method of manufacturing a lens assembly includes providing a housing having a first aperture and a second aperture, and positioning a relay lens in the housing to receive image photons that pass from a field-of-view (FOV) and through the first aperture, and pass the image photons toward the second aperture. The method further includes positioning a high-resolution lens in the housing and between the first aperture and the relay lens, and positioning a shutter device between the relay lens and the second aperture.

According to yet another embodiment, a computer readable storage medium having stored thereon a computer program, the computer program configured to generate an image of a full field-of-view (FOV), the image generated from photons passing from the full FOV, through a relay lens, and toward a shutter device, identify a first object-of-interest within the image for magnification, and position a high resolution lens to receive and pass photons from the identified first object-of-interest, through the relay lens, and toward the shutter device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A multi-resolution lens system comprising:
a relay lens positioned between a high-resolution lens and a shutter device, wherein the relay lens is positioned to receive a first plurality of image photons emanating from a field-of-view (FOV) without passing through the high-resolution lens;
wherein the high-resolution lens is positioned to receive a second plurality of image photons from the FOV and to pass the second plurality of image photons through the relay lens; and
wherein the shutter device is positioned to:

receive over a first portion thereof the first plurality of image photons of the FOV that pass through the relay lens without passing through the high-resolution lens; and simultaneously receive over a second portion thereof the second plurality of image photons from the portion of the FOV that pass through the high-resolution lens and through the relay lens.

2. The system of claim 1 comprising a controller configured to:

laterally re-position the high-resolution lens to pass image photons from a selected portion of the FOV toward the relay lens; and operate the shutter device to selectively pass image photons from the selected portion of the FOV and toward an image digitizing input.

3. The system of claim 2 comprising a focusing lens positioned between the shutter device and the image digitizing input and configured to focus the selectively passed image photons toward the image digitizing input.

4. The system of claim 2 wherein the controller is configured to laterally re-position the high-resolution lens and operate the shutter device without altering the FOV.

5. The system of claim 1 comprising a focusing lens positioned to receive the image photons from the portion of the FOV that pass through the high-resolution lens and through the relay lens, when the shutter device is selectively engaged to allow passage of image photons therethrough.

6. The system of claim 1 wherein the high-resolution lens is laterally positionable with respect to the relay lens in order to selectively focus image photons of the FOV toward the relay lens.

7. The system of claim 1 wherein the high-resolution lens has a focal length between approximately 10 mm and 15 mm.

8. The system of claim 1 wherein the shutter may be engaged to selectively allow a preferred area thereof to pass image photons therethrough.

9. The system of claim 8 wherein the shutter is one of a mechanical shutter and a liquid crystal display.

10. The system of claim 1 wherein an aperture of the relay lens is larger than an aperture of the high-resolution lens.

11. The system of claim 1 wherein a focal length of the relay lens is larger than a focal length of the high-resolution lens.

12. A method of manufacturing a lens assembly comprising:

providing a housing having a first aperture and a second aperture;

positioning a relay lens in the housing between the first and second apertures;

positioning a high-resolution lens in the housing and between the first aperture and the relay lens; and positioning a shutter device between the relay lens and the second aperture;

wherein positioning the relay lens comprises positioning the relay lens to:

receive a first plurality of image photons that passes from a field-of-view (FOV) through the first aperture and that bypass the high-resolution lens; and pass the first plurality of image photons toward the shutter; and wherein positioning the high-resolution lens comprises positioning the high-resolution lens to:

receive a second plurality of image photons that passes from the FOV through the first aperture; and pass the first plurality of image photons toward the shutter through the relay lens.

13. The method of claim 12 comprising configuring the high-resolution lens to be laterally positionable with respect to the first aperture.

14. The method of claim 13 comprising configuring a controller to operate the shutter device to pass image photons through a selected area of the shutter and block image photons in an unselected area of the shutter device.

15. The method of claim 14 comprising positioning a focusing lens between the shutter device and the second aperture such that image photons passed through the selected area of the shutter pass through the focusing lens and to a digitizing input.

16. The method of claim 14 comprising configuring the controller to identify an object-of-interest in the FOV, laterally position the high-resolution lens to focus on the identified object of interest, and operate the shutter device to pass image photons of the object-of-interest that pass through the high-resolution lens.

17. The method of claim 12 wherein positioning the shutter device comprises positioning one of a mechanical shutter and a liquid crystal display.

18. A non-transitory computer readable storage medium having stored thereon a computer program, the computer program configured to:

generate an image of a full field-of-view (FOV), the image generated from photons passing from the full FOV, through a relay lens, and toward a shutter device, wherein the relay lens is positioned between a high resolution lens and the shutter device and is positioned to receive a portion of the photons without passing through the high resolution lens;

identify a first object-of-interest within the image for magnification; and position the high resolution lens to receive and pass photons from the identified first object-of-interest, through the relay lens, and toward the shutter device.

19. The computer readable storage medium of claim 18 wherein the computer is configured to operate the shutter device to selectively pass photons of the first object-of-interest toward a digitizing input and block photons from the full FOV.

20. The computer readable storage medium of claim 19 wherein the computer is configured to operate the shutter device to selectively pass photons of the first object-of-interest using one of digital segmentation and color filtering.

21. The computer readable storage medium of claim 18 wherein the computer is configured to identify the first object-of-interest using one of a user prompt and an automated feature recognition.

22. The computer readable storage medium of claim 18 wherein the computer program is configured to identify a second object-of-interest within the FOV, reposition the high resolution lens to receive and pass photons from the identified second object-of-interest, and operate the shutter device to selectively pass photons of the second object-of-interest toward the digitizing input and block photons from the full FOV.

* * * * *